Oct. 21, 1969  S. A. PLATT  3,473,870
STEREOSCOPIC CONTINUOUS FILMSTRIP APPARATUS
Filed March 8, 1968  5 Sheets-Sheet 1

INVENTOR.
STEPHEN A. PLATT
BY
ATTORNEYS

Oct. 21, 1969   S. A. PLATT   3,473,870
STEREOSCOPIC CONTINUOUS FILMSTRIP APPARATUS
Filed March 8, 1968   5 Sheets-Sheet 3

INVENTOR.
STEPHEN A. PLATT
BY
ATTORNEYS

Oct. 21, 1969 S. A. PLATT 3,473,870
STEREOSCOPIC CONTINUOUS FILMSTRIP APPARATUS
Filed March 8, 1968 5 Sheets-Sheet 5

INVENTOR.
STEPHEN A. PLATT
BY
ATTORNEYS

United States Patent Office 3,473,870
Patented Oct. 21, 1969

3,473,870
STEREOSCOPIC CONTINUOUS FILMSTRIP APPARATUS
Stephen A. Platt, 1100 Fulton St., Grand Haven, Mich. 49417
Continuation-in-part of application Ser. No. 533,303, Mar. 10, 1966. This application Mar. 8, 1968, Ser. No. 711,617
Int. Cl. G03b 21/00
U.S. Cl. 353—7                    8 Claims

ABSTRACT OF THE DISCLOSURE

A stereoscopic viewing and/or projecting apparatus for viewing a multi-turn, continuous oval configurated stereoscopic filmstrip loop. The apparatus comprises a filmstrip cartridge having a first oval, circuitous support track to retain all but one turn of the multi-turn, oval loop of filmstrip, and a second oval, circuitous support track located at a divergent acute angle from the first support track to retain the one single turn of filmstrip. The cartridge has a free space inside the first and second support tracks to cause the filmstrip to be freestanding. An optical stereoscopic viewing device astraddles the single turn loop of filmstrip having associated therewith a double viewing device separated by a vision screening element so that the filmstrip can be viewed directly.

RELATED APPLICATION

This application is a continuation-in-part application of copending application Ser. No. 533,303, filed Mar. 10, 1966, and entitled Continuous Film Strip Apparatus.

BACKGROUND OF THE INVENTION

This invention relates to equipment for handling continuous filmstrip for stereoscopic viewing, and more particularly to a special viewing and/or projecting apparatus for stereoscopic viewing of a multi-turn, continuous oval configurated filmstrip loop.

The term "filmstrip" is used in the trade to designate a strip of interconnected photographic slides to be viewed. It differs from conventional motion picture film in usually being wider and having a relatively short length, i.e. measured in inches rather than feet. Motion picture film can easily be employed in closed loop form in a loop several inches in diameter, if it is sustained and positioned by an inner generally circular loosely fitting form. Since it is in the form of a closed loop, the innermost turn is always connected to the outermost turn. It is projected by continuously pulling away from the loop and taking beyond the endless roll, the portions of the film connecting the inner and outer convolutions. It is pulled into a configuration different from the loop, therefore.

Although supported, narrow, lengthy, motion picture film can be readily handled by this technique, filmstrip cannot. It has been found that filmstrip does not lend itself to being distorted out of its loop configuration. More specifically, it has been determined that, with a continuous loop of several turns of filmstrip only a few inches across, pulling one section continuously out of configuration by extending it creates tremendous friction problems between the filmstrip turns during advancement of the filmstrip. Distortion of the entire multiturn loop actually occurs if the loop is free-standing, i.e. without inner support.

The diverging angle which the film or filmstrip makes in departing and returning to a multiturn loop is a direct function of its width and becomes a critical factor with the filmstrip loop only a few inches across. Moreover, the multiple turns of the filmstrip must absorb angulation without the induced friction stopping the loop flow action. These factors present a substantial problem with wide, short length filmstrip. Therefore, what is really needed for handling the filmstrip is a method and apparatus for keeping this diverging angle and the resulting friction near nil, i.e. at a minimum.

Because of these practical problems in handling of continuous loop filmstrip, filmstrip has not been used in continuous loop form, particularly not for stereoscopic viewing or projection. Yet, it would be extremely desirable to do so, so that a small viewing or projecting cartridge could be conveniently and very effectively used for such purposes as advertising, education and/or entertainment.

SUMMARY OF THE INVENTION

It is an object of this invention to provide a simple, unique, inexpensive, stereoscopic filmstrip viewer and/or projector enabling a small continuous loop of short wide stereoscopic filmstrip to be viewed or projected, while all of the turns of the loop are kept in the same configuration, even the portions being viewed. Moreover, all of the turns are in freestanding form, i.e. without inner support. The filmstrip can be advanced without any significant friction between the turns of the multiple loop, or any distortion into a configuration other than the loop configuration.

The stereoscopic, compact filmstrip viewer and/or projector is capable of retaining an entire continuous multiple turn filmstrip in a small loop, enabling simple and easy loading, and simple advancement of frames of the loop for viewing. The film loop can be of varied number of turns, of varied length, and of varied width. It moreover can be advanced in either direction at any time or stopped for any period of time. It has optical viewing means or light projection means located in the free space within the freestanding loop. The novel unit enables stereoscopic viewing without interference between images to be seen by the eyes. The loop is retained in simple oval configuration, with the turn that is separated being also held in the oval configuration while allowing viewing thereof.

These and other objects of this invention will become apparent upon studying the following specification in conjunction with the drawings in which.

Figure 1:
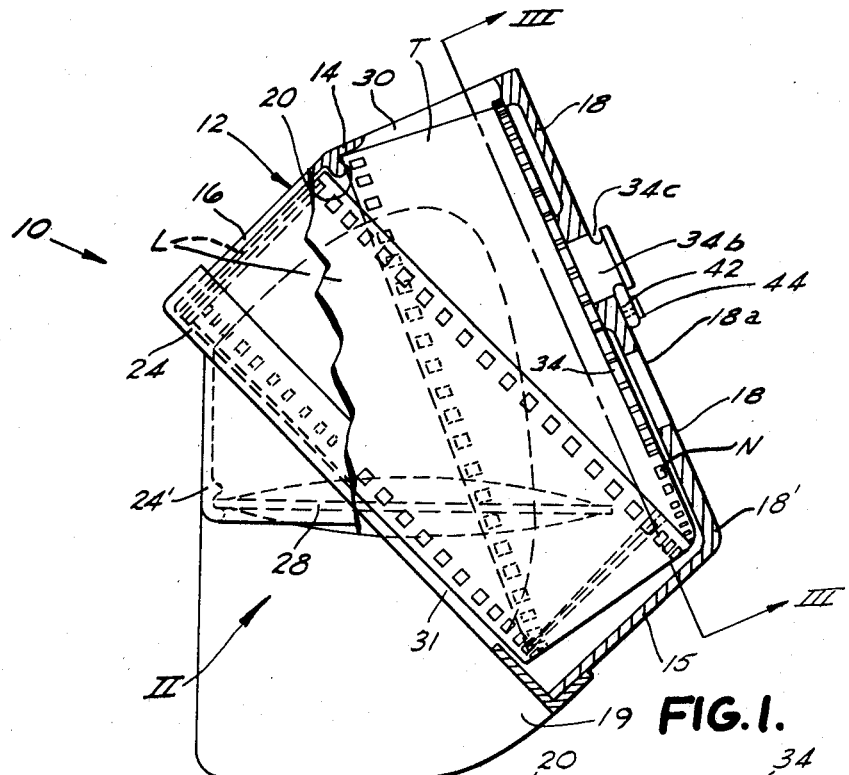
FIG. 1 is a side elevational partially sectioned view of the first form of the apparatus.
Figure 2:
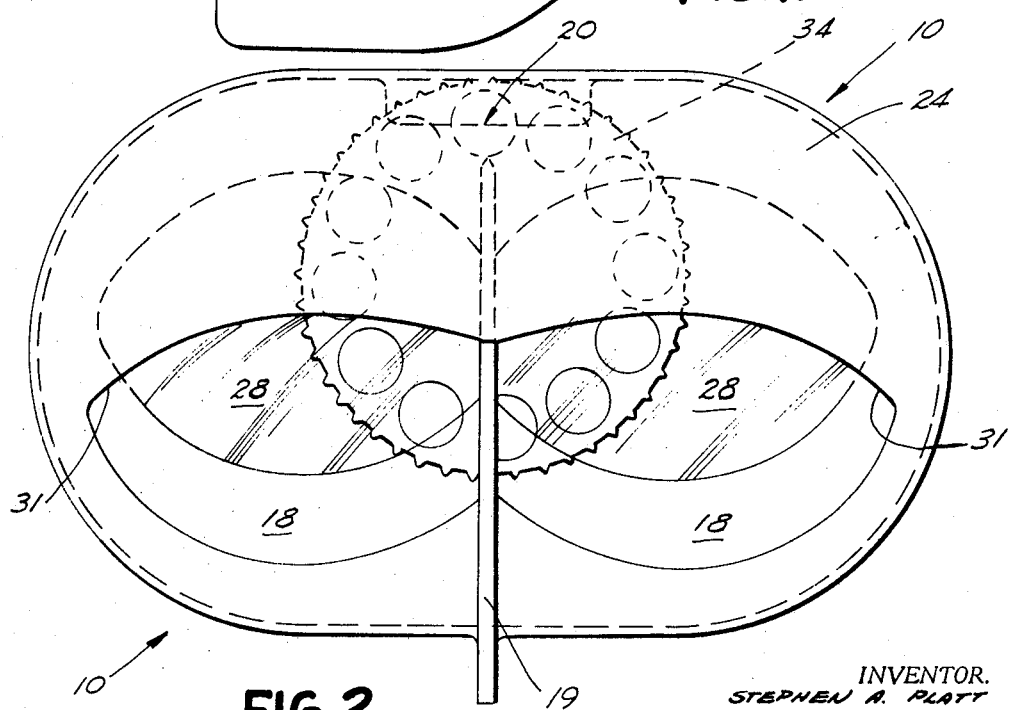
FIG. 2 is a view of the apparatus in FIG. 1, taken in the direction indicated by the arrow II in FIG. 1.
Figure 3:
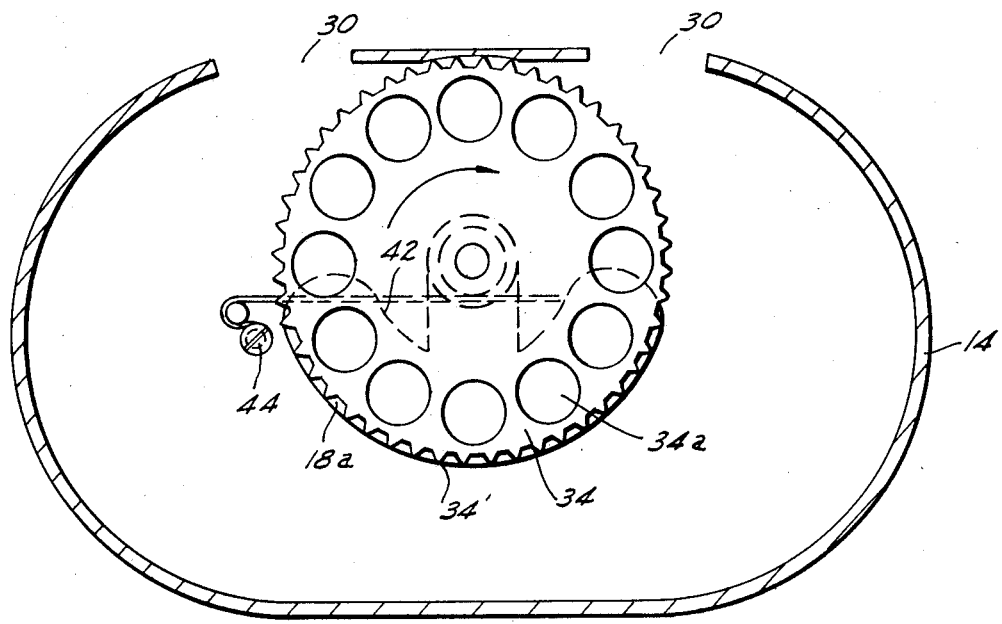
FIG. 3 is a sectional view taken on plane III—III of FIG. 1.

Referring now specifically to the drawings, the cartridge assembly 10 in the first form of the apparatus shown in FIGS. 1 through 3 basically includes a hollow oval support housing 12 formed of an oval lower portion 14, and an oval upper portion 16 having the same width and length dimensions as lower portion 14, and generally integral therewith, but diverging therefrom at a small acute angle. Housing portions 14 and 16 have axially adjacent wall portions on one side of the housing, with these annular wall portions merging together to a common wall portion 15 on the opposite side of the housing.

One of the housing portions, specifically upper portion 16 in this illustrated form of the device, comprises a receiving and retaining means for the multiple turn, freestanding stereoscopic filmstrip loop L. The loop is basically supported on one side by edge 18' of end wall 18, and a small dividing ledge 20 projecting inwardly between portions 14 and 16 opposite edge 18'. On its opposite (upper) side, the loop is retained by peripheral cover 24 which closes the open upper side of the housing. Actually, if this structure is inverted, the cover then supports the filmstrip.

In this form of the device, the cover, and more specifically an integral projection 24' supports and mounts a pair of twin magnifying lenses 28 which extend within the free space within the multiple turn loop L and single turn T. The central area of cover 24 adjacent lenses 28 is cut out to form openings 31 to enable direct viewing through the lenses by a person's eyes in the direction indicated by the arrow in FIG. 1. The lenses are aligned with openings 30 in the outer diameter of portion 14 of housing 12, and aligned with respective frames of the adjacent single turn portion T that interconnects the innermost and outermost turns of the filmstrip loop L. The lenses and openings are separated by a special view splitting panel 19 forming a vision screening means and projecting from the housing toward the nose of a person looking at lenses 28. Continued advancement of the loop in either direction causes progressive portions of the multiple turn loop to take the place of oval shaped turn T divergent axially from the remaining oval turns, beneath ledge 20 and adjacent surface 18 for direct viewing of a pair of stereoscopic film frames.

The multiple turn filmstrip is not suported by any inner means in the housing. It is freestanding, self-supporting, and oval in configuration, both in the single turn T that departs mometarily from the multiple turn loop, and in the remaining turns of the loop. The oval includes a pair of semi-circular ends separated by a straight section therebetween. Advancement of the film by rotation of the filmstrip can be very easily and smoothly accomplished without any distortion and practically no friction. In fact, due to the freestanding frictionless nature of the filmstrip in this housing, the entire loop can be advanced smoothly by advancing the single turn T. This may be achieved for example with the sprocket or telephone dial type equipment shown. More specifically, mounted inside the housing, adjacent base end 18, is a circular dial 34 having spaced radial teeth 34' on its outer periphery, to engage the notches in the filmstrip, particularly in turn T of the film strip. Similar to a telephone dial, this disc 34 has finger-receiving openings 34a at spaced intervals around its periphery, which are accessible through an elongated finger-receiving opening 18a in surface 18. This opening may be L-shaped in configuration as shown in FIG. 3, for easy mounting of the disc. The disc includes a central axle 34b which extends down through a bearing opening in the housing end 18. A retainer spring 42, attached to end 18 by pin 44, engages annular groove 34c in axle 34b. By shifting spring 42 against its bias, axle 34b of the dial can be released to be inserted or removed from engagement with the housing portion.

With this construction, advantage is taken of the filmstrips stable free flowing, freestanding characteristics, worked in its oval configuration, to wrap the turns of the loop around the viewing twin magnifier which is actually located in the space within the loop. The twin magnifier may be an integral part of the molded cartridge, in the preferred form of the device, for example by mounting it integrally with cover 24. The unit is extremely handy to use, as well as compact, without requiring complex mechanism such as linkages, shifters, etc. to operate upon the filmstrip loop. The drive system or advancing means for the filmstrip actually occupies some of the space within the continuous loop, as does at least a portion of the optics.

In operation of this form of the device therefore, the oval continuous filmstrip multiple turn loop is inserted merely by removing cover 24 with magnifying lens 28, inserting it, placing the interconnecting turn T (between the outermost turn and innermost turn of the loop) beneath ledge 20, and the remaining turns on ledge 20. With replacement of cover 24, lenses 28 are inserted directly into the space within the loop, aligned with outlet openings 30 and adjacent filmstrip portions. The dial advancer 34 is engaged with the loop by sliding it into the position shown in FIGS. 1 and 3, and engaging biasing spring 42 therewith to retain teeth 34' in engagement with the filmstrip notches of turn T adjacent opening 30. Then, by inserting one's finger through opening 18a, and shifting it arcuately, successive frames of the filmstrip are advanced between lenses 28 and openings 30 for direct stereoscopic viewing of the frames in the generally linear strip of film of the separated turn. All but one turn of the loop is therefore on a first oval support track means having outer peripheral loop retaining means, with the one turn T that is being viewed being on a second oval support track means having outer peripheral retaining means, and merging with the first. The first track means is at an acute angle to the second track means. The optical viewing means, astraddle the second track means and turn T, includes optical lens means and means of increasing light intensity on the singulated filmstrip portions viewed. The optical viewing means here is direct viewing means but can include projection viewing means as explained hereinafter. The means of increasing light intensity are twin openings to external light to form light inlet means, but can include or comprise a twin light source, as explained hereinafter.

Second form

Figure 4:
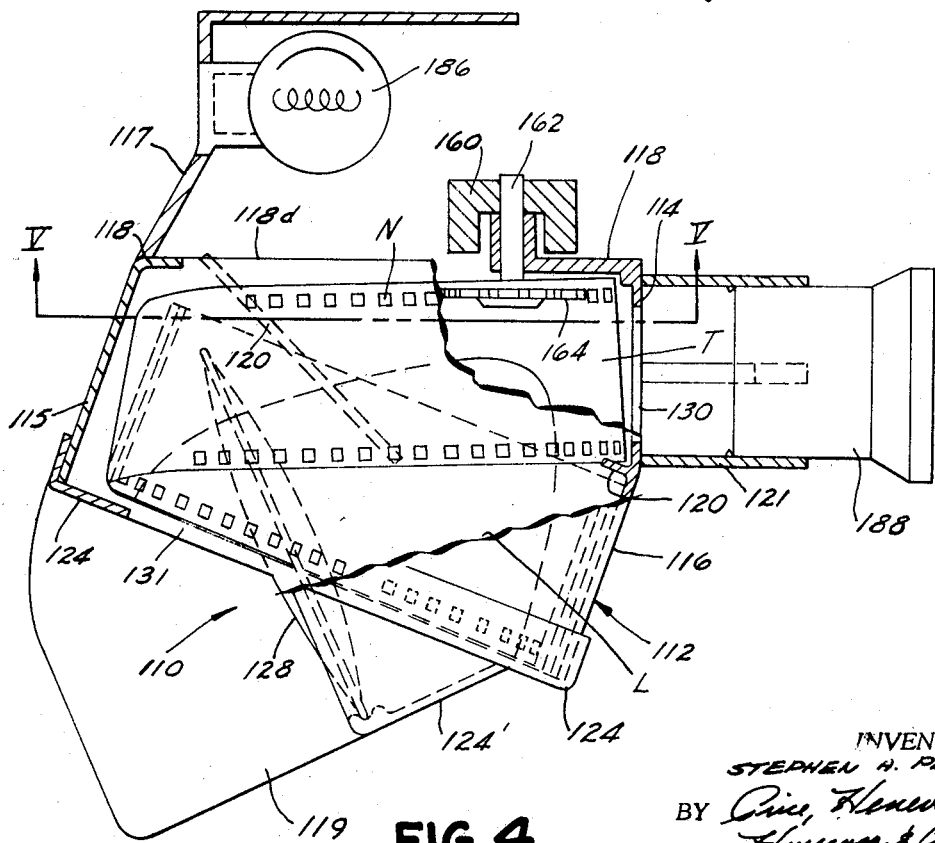
FIG. 4 is a side elevational view of a second form of the novel apparatus.
Figure 5:
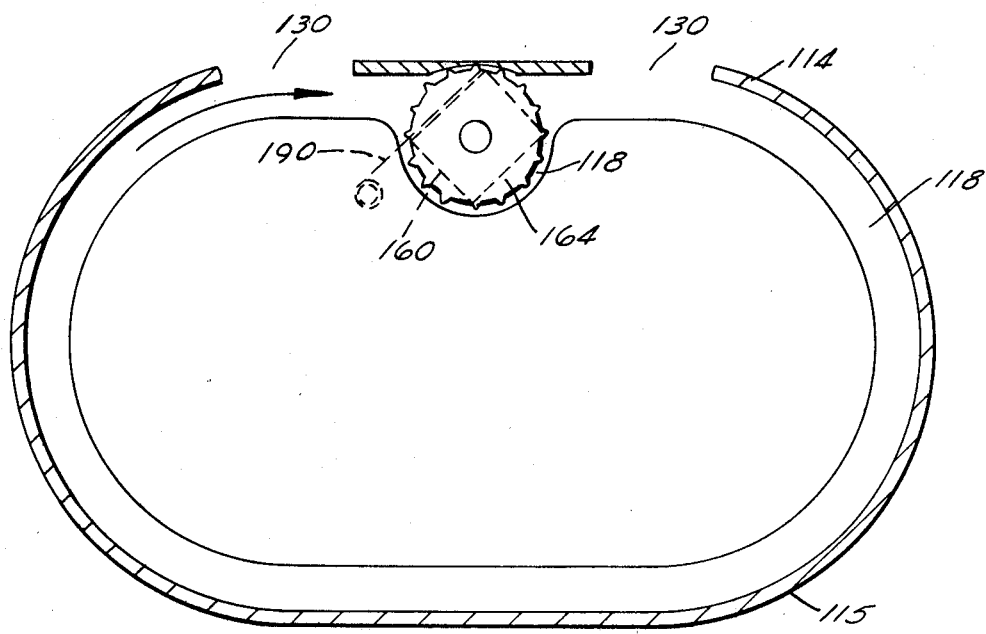
FIG. 5 is a sectional view taken on plane V—V of FIG. 4.

Instead of having only a direct viewing assembly as in FIGS. 1 through 3, employing the twin magnifying lenses, it may be desirable to have the novel cartridge employed in the manner to project the stereoscopic images. In fact, both direct viewing and screen projection can be incorporated in the same assembly, as shown in FIGS. 4 and 5.

In this modified form of assembly 110, housing 112 is practically the same as before, including adjacent oval housing portions 116 and 114 separated by ledge 120, integrally associated and converging at common wall 115 opposite apertures 130. Cover 124 includes a portion 124' supporting the direct viewing magnifying optical lenses 128 which project, with placement of the cover on the assembly, down into the space within the multiple turn oval filmstrip loop L, aligned with housing openings 130 and a portion of oval single turn T of the filmstrip. This single turn, as previously, is kept in the same configuration as the rest of loop L, but projecting at an acute angle therefrom by traveling beneath ledge 120 and surface 118. The lenses 128 are viewed through a pair of twin openings 131 separated by a protruding vision blocking panel 119.

The manual advancing means in this instance is slightly modified, including a knob 160 mounted on a rotational pin 162 to which a smaller sprocket 164 is attached. This sprocket located inside the housing adjacent base 118, and adjacent openings 130, engages the notches in turn T of the loop. An adjacent portion of the surface or base 118 is cutaway to form a second lower opening 118d. Advancement of each individual frame of turn T of the filmstrip to align frames may be regulated by having a mounted leaf spring 190 engaging progressive sides of the square knob 160.

Within the confines of the multiple turn film loop, and inside the housing is a pair of twin mirrors 170 aligned with and positioned diagonally with respect to openings 118d and openings 130. These are projection lamp mirrors, being generally on a 45° angle to an exterior axially positioned pair of twin light sources 186. A pair of twin projection lens assemblies 188 are aligned with openings 130 exterior of the housing. Hence, the light imposed on mirrors 170 by lamps 186 is reflected through controlled frames of the linear portion of turn T in front of openings 130, and through projection lenses 188. Thus, in this instance, portions of the optical viewing means located within the space within the freestanding multi-turn filmstrip loop includes both projecting mirrors 170 and direct viewing optical lenses 128. This enables a completely compact versatile assembly to be formed. Lens assemblies 188 may be mounted to the housing by suitable projection supports 121. Lamp means 186 may be mounted on suitable housing projection portions 117.

The operation of this assembly is basically similar to that described with respect to the first form of the invention, except that the device may be used as a direct viewing unit, or as a projection unit, or both. Yet, the complete assembly is compact, convenient and easy to use, and enables self-supporting, freestanding filmstrip loops of only a few inches in width and length to be readily employed for a multiple of purposes.

Third form

Figure 6:
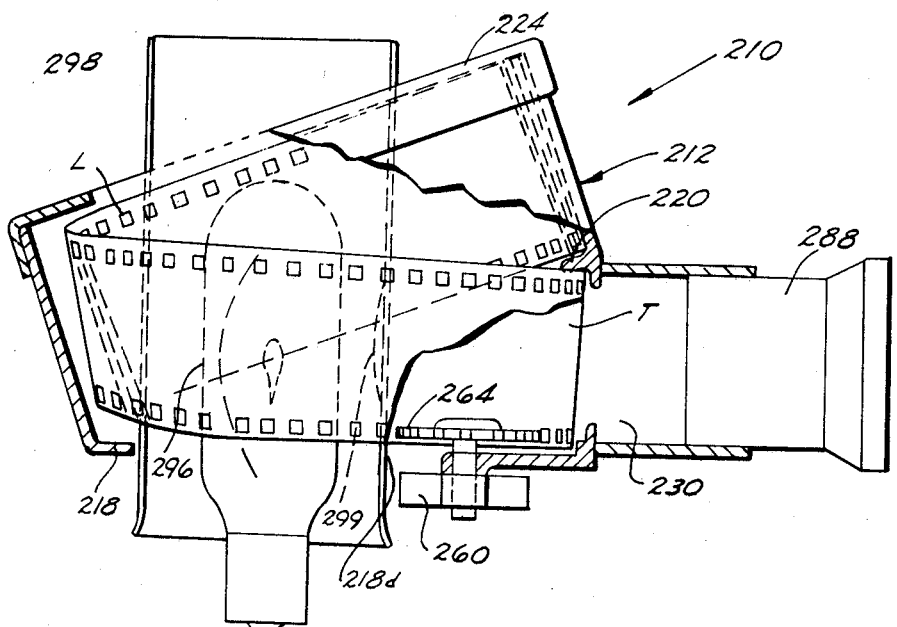
FIG. 6 is a side elevational view of the third form of the novel apparatus.
Figure 8:
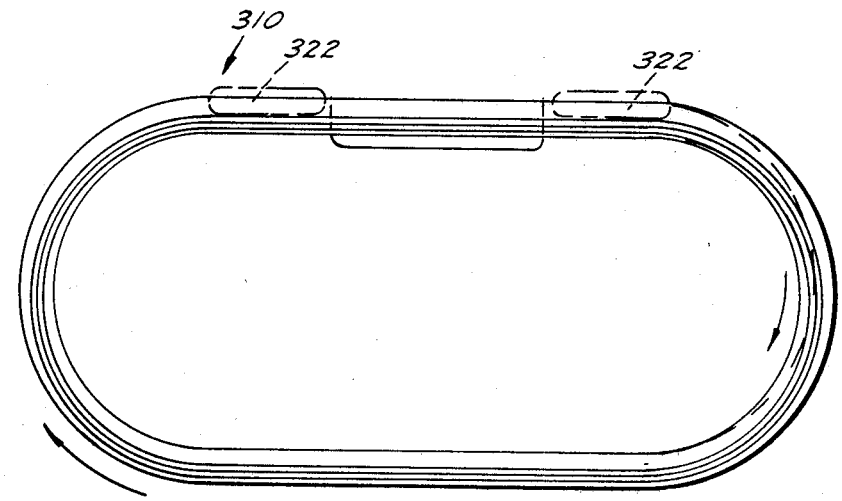
FIG. 8 is a sectional view of the fourth form taken on plane VIII—VIII in FIG. 9.
Figure 7:
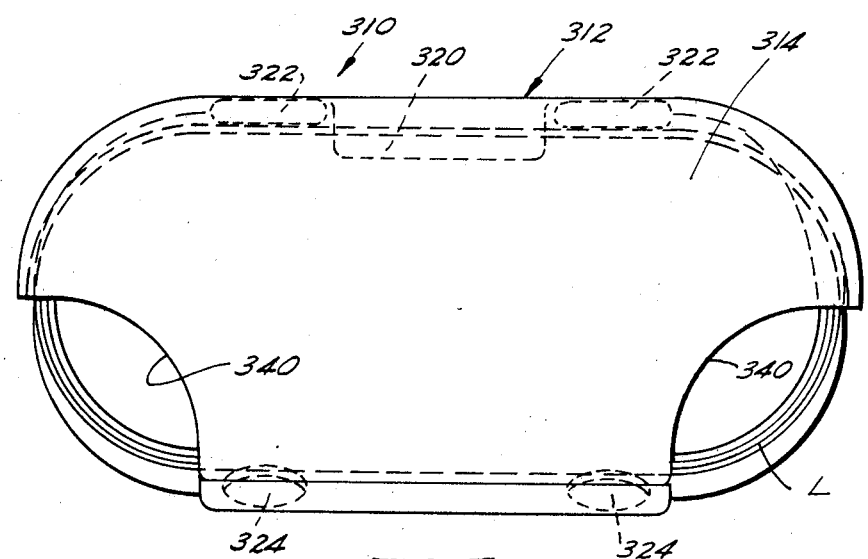
FIG. 7 is a top view of a fourth form of the novel apparatus, particularly suited to accommodate 16 mm. filmstrip.
Figure 9:
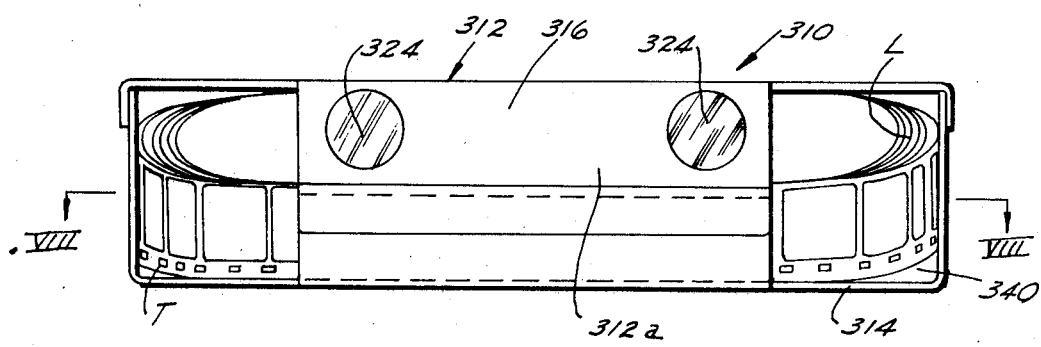
FIG. 9 is a front elevational view of the fourth form.
Figure 10:
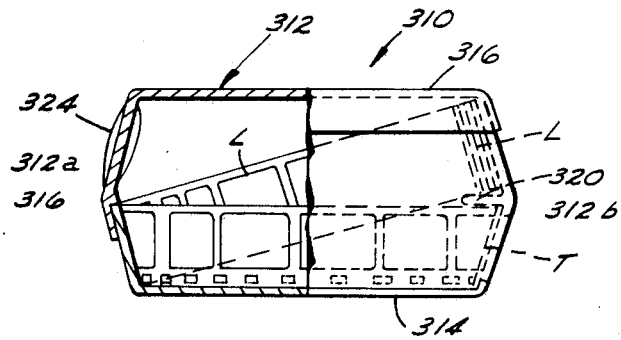
FIG. 10 is a partially sectioned, end elevational view of the fourth form.

As an alternative to the direct viewing device in FIGS. 1 through 3 where the lenses extend within the space in the loop, or to the combination direct viewing projecting device shown in FIGS. 4 and 5 where the lenses and projecting mirrors both extend within the space within the loop, the novel apparatus may be employed only as a projection type device with the freestanding, self-supporting film loop as shown in FIG. 6. This modified form of assembly, 210, basically includes the same type housing 212 having enclosure means for the multiple turn film loop L having all but one turn supported in circular form in the upper track portion of the housing on ledge 220 and above surface 218, and retained by cover 224. The single circular turn T, momentarily and progressively separated from the multiple turns at an acute angle thereto, and aligned with openings 230, is advanced by a sprocket 264 with a square knob 260 which may be manually mechanically advanced 90° at a time. In this instance, however, the twin light sources 296 for the projection system project into the space within the multiple turn loop. These sources may be mounted within an enclosure housing 298, having openings 299 aligned with openings 230 in the housing, and thus aligned with the projection lens assemblies 228.

Basically the operation of this third form of the device is similar to those previously described. In fact, the housing structure shown in FIG. 6 may be practically identical to that shown in FIG. 4, except that the mirrors and lenses are removed, and the light projection light sources are inserted directly through opening 218d for alignment with outlets 230 and projection lens units 288. The filmstrip is advanced a multiple of frames at a time to align each pair of stereoscopically correlated film frames with the twin viewing means.

Fourth form

The related structure 310 in FIGS. 7–10 is especially suitable for steroscopic viewing of 16 mm. filmstrip. As previously, the filmstrip is of freestanding, continuous, oval configuration form, having spaced stereoscopically cooperative frames.

The housing 312 is of oval configuration, being formed of an oval lower portion 314 and an oval upper cover portion 316 interfitting therewith. The housing has a generally flat configuration. As previously, it forms a first oval support track means shown extending diagonally from the lower front 312a to the upper rear 312b of the housing, the front and rear being on opposite sides of the smaller width dimension. This is to support all but one of the multiple turns of the loop L. It also forms a second oval support track means along the bottom of the housing for the singulated turn of the loop to be viewed. The singulated turn T extends at an acute angle to the others and is retained temporarily separated therefrom by the central lip or edge 320 that protrudes into the housing between the pair of spaced twin light receiving openings 322 in the housing rear. Cover 316 extends further down in the front than in the rear and ends, to mount a pair of spaced viewing lenses 324. These are at an angle and spaced such as to align with openings 322, for viewing of a pair of stereoscopically cooperative frames of the linear section of the singulated single turn T. The housing peripheral walls retain the filmstrip loop, but no support means is provided inside the filmstrip, enabling a direct viewing through this open space.

The smaller 16 mm. film images are viewed under relatively higher magnification with the lenses being close to the viewer's eyes. These lenses are therefore located in the side wall of the casing rather than the optical elements being in the inner space of the film loop. The line of sight is across the open inner space of the narrow dimension of the oval loop. This dimension is made to match the working length of the optical lenses.

Advancement of the filmstrip can be manually done through a pair of end openings 340 in the housing.

Loading and operation of the oval filmstrip is substantially like that of the previous forms described.

It is conceivable that certain minor details of construction could also be modified further within the concepts presented. Hence, it is intended that the invention should be limited only by the scope of the appended claims, and the reasonably equivalent structures to those defined therein.

The embodiments of the invention in which an exclusive property or privilege is claimed are defined as follows:

1. Continuous loop filmstrip, stereoscopic viewing apparatus, comprising: a filmstrip cartridge housing defining first oval, circuitous support track means and peripheral, film loop retaining means dimensioned to receive, support, and retain all but one turn of a multiple turn, freestanding oval loop of stereoscopic filmstrip; said housing also having second oval, circuitous support track means and peripheral, film loop retaining means to receive, support, and retain said one turn of filmstrip; said second support track means being divergent from said first support track means at an acute angle to said first support track means to cause progressive portions of the filmstrip loop to be singulated in said one turn with advancement of the filmstrip portions in said housing; said housing having free space inside said first and second support track means to cause the filmstrip to be freestanding, stereoscopic viewing means astraddle said second support track means at its minor dimension, to be astraddle the singulated filmstrip portions in said one turn, and including double viewing means separated by vision screening means.

2. The stereoscopic apparatus in claim 1 wherein said stereoscopic viewing means includes a pair of optical lens means and a cooperative pair of means for increasing light intensity on the singulated filmstrip portions, and one of said pair of means protruding into said free space.

3. The apparatus in claim 2 wherein: said pair of optical lens means include a pair of magnifying lenses protruding into said free space and exposed for direct viewing, said housing includes a pair of light inlet openings opposite said magnifying lenses to serve as said means of increasing light intensity, said optical lens means also includes a pair of projection lens means adjacent said openings; and said apparatus includes a pair of light reflecting mirror mens also protruding into said free space and a pair of light source means; said pairs of mirror means, light source means, openings and projection lens means being arranged to project filmstrip images that are on said singulated filmstrip portions as well as said apparatus allowing direct magnified stereoscopic viewing of said said filmstrip portions.

4. The apparatus in claim 2 wherein said means of increasing light intensity includes a pair of light sources protruding into said free space; and said optical lens means includes a pair of projection lens means on the opposite side of said second support track means from said light sources to project filmstrip images that are on said singulated filmstrip portions.

5. The stereoscopic apparatus in claim 1 wherein said stereoscopic viewing means comprises a pair of like direct viewing magnifying lenses protruding into said free space and exposed for direct viewing.

6. The stereoscopic apparatus in claim 5 wherein said pair of means for increasing light comprises a pair of spaced apertures opposite said pair of lenses.

7. The apparatus in claim 1 including rotational sprocket means in said housing engageable with progressive filmstrip portions.

8. The apparatus in claim 1 wherein said stereoscopic viewing means includes a pair of optical lenses in said housing on one side of said second support track means, and means on the opposite side of said second support track means for increasing light intensity, and wherein said apparatus defines an open space within said second support track means.

References Cited

UNITED STATES PATENTS

| | | | |
|---|---|---|---|
| 2,380,088 | 7/1945 | Tickell | 352—126 |
| 3,206,757 | 9/1965 | Schrader | 352—72 X |
| 3,244,471 | 4/1966 | Mead | 352—72 X |
| 3,265,457 | 8/1966 | Dale | 352—129 |
| 3,278,252 | 10/1966 | Wagner et al. | 352—72 |

FOREIGN PATENTS 1,359,359   3/1964   France.

NORTON ANSHER, Primary Examiner

R. M. SHEER, Assistant Examiner

U.S. Cl. X.R.

350—135, 141, 143; 352—129, 72